Patented Apr. 30, 1957

2,790,783

MIXTURES COMPRISING ACRYLONITRILE POLYMERS WITH POLYVINYLPYRROLIDONE AND FIBERS THEREOF

Harry W. Coover, Jr., Kingsport, Tenn., assignor to Eastman Kodak Company, Rochester, N. Y., a corporation of New Jersey No Drawing. Application July 18, 1956,
Serial No. 598,524

15 Claims. (Cl. 260—30.2)

This invention relates to resinous compositions comprising mixtures of acrylonitrile polymers and poly-N-vinylpyrrolidone.

This application is a continuation-in-part of my copending application Serial No. 290,565, filed May 28, 1952 (now abandoned).

It is known that polyacrylonitrile fibers can be spun which have excellent physical properties such as high strength, high sticking temperatures, and good resistance to shrinkage at elevated temperatures. However, these fibers show certain disadvantageous properties which severely limit their commercial use such as low moisture absorption and poor dyeability with most presently available dyes. For a great many textile purposes, improved dyeability of these fibers would be highly desirable.

It is further known that greatly increased moisture absorption and dyeability of acrylonitrile fibers can be obtained by copolymerizing acrylonitrile with certain hydrophilic monomers such as acids, amides, esters, etc., which contain an unsaturated ethylenic linkage. The degree of improvement in these properties varies with type and amount of the monomer copolymerized with acrylonitrile. When an amount of modifier has been copolymerized with acrylonitrile sufficient to give desirable moisture absorption and dyeability, it is usually found that the resulting fibers have such low sticking temperatures and high shrinkage at elevated temperatures that they are not suitable for most textile purposes. On the other hand, N-vinyl-α-pyrrolidone homopolymerizes to a water-soluble polymer which has had limited technical application as a textile assistant and as a finishing, thickening, sticking or binding agent. Obviously, polyvinylpyrrolidone by itself is not a satisfactory material for fiber making purposes.

I have now found that polyacrylonitrile and polyvinylpyrrolidone, neither of which are satisfactory for commercial fiber making purposes, are not only compatible with one another when mixed in certain proportions, for example, in common solvents or in heated and kneaded mixes, but also give from such solutions or compositions on spinning modified polyacrylonitrile fibers which show no segmentation defects, have higher sticking temperatures than fibers spun from a copolymer of acrylonitrile containing the same amount of vinylpyrrolidone to impart the same dyeability and moisture absorption. In addition, the fibers spun from the mixtures show very little shrinkage at elevated temperatures as compared with those spun from a copolymer.

It is, accordingly, an obect of the invention to provide new resinous compositions comprising certain mixtures of polyacrylonitrile and polyvinylpyrrolidone. Another object is to provide homogeneous solutions in organic solvents of these mixtures. Another object is to provide fibers from these mixtures which have certain highly desirable properties. Another object is to provide methods for preparation of the products of the invention. Other objects will become apparent hereinafter.

In accordance with my invention, I prepare resinous compositions comprising mixtures of from 70 to 95 parts by weight of polyacrylonitrile or an acrylonitrile polymer containing at least 70 percent by weight of acrylonitrile and the remainder of another polymerizable ethenoid compound such as a vinyl ester, an isopropenyl ester, an acrylic or methacrylic acid ester, etc., and from 30 to 5 parts by weight of polyvinylpyrrolidone. The above mixtures can be prepared by any or several methods. For example, the polymeric components can be mixed together in a suitable mixer such as a ball mill or Banbury mixer, or they can be dissolved in one or more common solvents such as N,N-dimethyl formamide, N,N-dimethyl acetamide, gamma-butyrolactone, ethylene carbonate, N-methyl-2-pyrrolidone, and similar polyacrylonitrile solvents. The components can be mixed together before addition to the solvent or they can be added separately to the solvent or their separate solutions can be mixed together. They can also be added to the solvent to produce a slurry or dispersion, which is then agitated and heated to complete dissolution. The concentration of the mixed polymers can be varied depending on the use for which the particular composition is intended.

For fiber spinning purposes a concentration of about from 5 to 30 percent of the mixed polymers of the invention in any of the mentioned suitable solvents is preferred. The solutions prepared as above described are stable, homogeneous mixtures which show no tendency even on long storage to separate into their separate components. The absence of graininess in these solutions permits smooth, trouble-free extrusion through jets in both wet and dry fiber-spinning procedures.

Suitable acrylonitrile polymers include polyacrylonitrile and copolymers containing at least 70 percent by weight of acrylonitrile and up to 30 percent of another polymerizable ethenoid compound such as a vinyl ester of a saturated carboxylic acid (e. g. vinyl acetate, vinyl propionate, vinyl butyrate, vinyl benzoate, etc.), an isopropenyl ester of a saturated fatty acid containing from 2 to 4 carbon atoms (e. g. isopropenyl acetate, isopropenyl propionate, etc.), an acrylic or methacrylic acid alkyl ester (e. g. methyl acrylate, ethyl acrylate, propyl acrylate, butyl acrylate and corresponding methacrylic acid esters), vinyl chloride, vinylidene chloride, styrene, alpha-methylstyrene, and the like. Suitable polyvinyl pyrrolidones have been described in the literature, for example, by W. Reppe in U. S. 2,265,450, dated December 9, 1941.

The following examples will serve to illustrate further the new resinous compositions of my invention and the manner of their preparation.

*Example 1*

Fibers obtained from a mixture of 20 parts by weight of poly N-vinyl α-pyrrolidone and 80 parts by weight of polyacrylonitrile had a tenacity of 2.3 g./d., extensibility of 25 percent and a shrinkage of 15 percent in boiling water. The fibers showed excellent affinity for acetate, direct, wool and vat dyes. They had a sticking temperature above 215° C.

*Example 2*

Fibers obtained from a mixture of 10 parts by weight of polyvinylpyrrolidone and 90 parts by weight of polyacrylonitrile had a tenacity of 2.9 g./d., extensibility of 18 percent and a shrinkage of 12 percent in boiling water. The fibers showed excellent affinity for acetate, direct, wool and vat dyes. They had a sticking temperature above 225° C.

*Example 3*

Fibers obtained from a mixture of 30 parts by weight of polyvinylpyrrolidone and 70 parts by weight of polyacrylonitrile had a tenacity of 2.6 g./d., extensibility of 15 percent and a shrinkage of 16 percent in boiling water.

3

The fibers showed excellent affinity for acetate, direct, wool and vat dyes. They had a sticking stemperature above 200° C.

Example 4

2 g. of polyvinylpyrrolidone were dissolved in 50 cc. of dimethylformamide. The polymer dissolved rapidly to give a clear solution. 8 g. of polyacrylonitrile were added at room temperature and the mixture was stirred for several hours, which resulted in a clear, viscous dope. The polyacrylonitrile used had an intrinsic viscosity of 1.9.

Wet spun fibers from this mixture had a tenacity of 2.6 g./d. and 21% extensibility after drafting and relaxing. The sticking temperature of the fiber was 215° C. and it showed excellent affinity for acetate, wool and vat dyes.

Example 5

1 g. of polyvinylpyrrolidone was dissolved in 50 cc. of dimethylacetamide. After stirring for several minutes, a clear solution was obtained. 9 g. of a copolymer of acrylonitrile containing 10% by weight of vinyl acetate and the remainder of acrylonitrile, and having an intrinsic viscosity of 1.6, were added to this solution. After stirring for 30 minutes, a clear, viscous dope was obtained.

Fibers spun by spinning into a water bath, followed by drafting 600% and relaxing 15%, had a tenacity of 2.7 g./d. and an extensibility of 32%. The fibers showed excellent affinity for wool, acetate and vat dyes.

Example 6

1.5 g. of polyvinylpyrrolidone were dissolved in 50 cc. of dimethylformamide to give a clear solution. 8.5 g. of a copolymer of acrylonitrile containing 5% by weight of methyl acrylate and the remainder of acrylonitrile, and having an intrinsic viscosity of 1.7, were added to the solution and after stirring for one hour gave a clear, smooth dope.

Wet spun fibers from this dope were drafted 500% and relaxed 12%, and gave a tenacity of 2.9 g./d. and an extensibility of 27%. The fibers showed excellent affinity for wool and vat dyes.

Example 7

2 g. of polyvinylpyrrolidone were dissolved in 45 cc. of dimethylformamide to give a clear solution. 8 g. of a copolymer of acrylonitrile containing by analysis 8% by weight of methyl methacrylate and the remainder of acrylonitrile, and having an intrinsic viscosity of 1.6, were added to the solution and after stirring for one hour gave a clear, viscous dope.

Wet spun fibers from this dope were drafted 550% and relaxed 13%. The properties were 3.4 g./d. for tenacity and an extensibility of 31%. The fibers showed excellent affinity for wool and vat dyes.

Other fibers having generally similar properties to those described in the preceding examples can also be prepared from mixtures comprising from 70 to 95 parts by weight of any of the other mentioned acrylonitrile polymers containing from 70 to 95 percent by weight of acrylonitrile, the remainder being another polymerizable ethenoid such as previously mentioned, and from 30 to 5 parts by weight of polyvinyl pyrrolidone.

Although the mixed compositions of the invention have been specifically described in connection with their use for fiber-forming purposes, these compositions are also adaptable to the preparation of sheet materials useful, for example, as photographic film supports and molding compositions which may or may not contain, as desired, suitable plasticizers, fillers, dyes, and the like added materials. For sheet making purposes, the mixed compositions can be coated from their solutions on smooth surfaces of metal, glass, etc., or extruded from their hot melts. Shaped articles can be prepared from the molding compositions containing substantially amounts of the mixed compositions of the invention by injection, extrusion and compression methods. Such shaped articles are characterized by dimensional stability due to low shrinkage and good resistance to heat.

I claim:

1. A resinous composition comprising a mixture of from 70 to 95 parts by weight of an acrylonitrile polymer selected from the group consisting of polyacrylonitrile and a copolymer containing from 70 to 95 percent by weight of acrylonitrile and from 30 to 5 percent by weight of another polymerizable ethenoid monomer selected from the group consisting of a vinyl ester of a saturated fatty acid containing from 2 to 4 carbon atoms, an isopropenyl ester of a fatty acid containing from 2 to 4 carbon atoms, an acrylic acid alkyl ester, a methacrylic acid alkyl ester, vinyl chloride, vinylidene chloride, styrene and alpha-methylstyrene and from 30 to 5 parts by weight of poly-N-vinylpyrrolidone.

2. A resinous composition comprising a mixture of from 70 to 95 parts by weight of polyacrylonitrile and from 30 to 5 parts by weight of poly-N-vinylpyrrolidone.

3. A resinous composition comprising a mixture of from 70 to 95 parts by weight of an acrylonitrile polymer consisting of from 70 to 95 percent by weight of acrylonitrile and from 30 to 5 percent by weight of vinyl acetate, and from 30 to 5 parts by weight of poly-N-vinylpyrrolidone.

4. A resinous composition comprising a mixture of from 70 to 95 parts by weight of an acrylonitrile polymer consisting of from 70 to 95 percent by weight of acrylonitrile and from 30 to 5 percent by weight of methyl acrylate, and from 30 to 5 parts by weight of poly-N-vinylpyrrolidone.

5. A resinous composition comprising a mixture of from 70 to 95 parts by weight of an acrylonitrile polymer consisting of from 70 to 95 percent by weight of acrylonitrile and from 30 to 5 percent by weight of methyl methacrylate, and from 30 to 5 parts by weight of poly-N-vinylpyrrolidone.

6. A solution of a resinous composition comprising a mixture of from 70 to 95 parts by weight of an acrylonitrile polymer selected from the group consisting of polyacrylonitrile and a copolymer containing from 70 to 95 percent by weight of acrylonitrile and from 30 to 5 percent by weight of another polymerizable ethenoid monomer selected from the group consisting of a vinyl ester of a saturated fatty acid containing from 2 to 4 carbon atoms, an isopropenyl ester of a saturated fatty acid containing from 2 to 4 carbon atoms, an acrylic acid alkyl ester, a methacrylic acid alkyl ester, vinyl chloride, vinylidene chloride, styrene and alpha-methylstyrene, and from 30 to 5 parts by weight of poly-N-vinylpyrrolidone, in a solvent selected from the group consisting of N,N-dimethyl formamide, N,N-dimethyl acetamide, ethylene carbonate, N-methyl-2-pyrrolidone and gamma-butyrolactone.

7. A solution of a resinous composition comprising a mixture of from 70 to 95 parts by weight of polyacrylonitrile and from 30 to 5 parts by weight of poly-N-vinylpyrrolidone, in N,N-dimethyl formamide.

8. A solution of a resinous composition comprising a mixture of from 70 to 95 parts by weight of an acrylonitrile polymer consisting of from 70 to 95 percent by weight of acrylonitrile and from 30 to 5 percent by weight of vinyl acetate, and from 30 to 5 parts by weight of poly-N-vinylpyrrolidone, in dimethyl acetamide.

9. A solution of a resinous composition comprising a mixture of from 70 to 95 parts by weight of an acrylonitrile polymer consisting of from 70 to 95 percent by weight of acrylonitrile and from 30 to 5 percent by weight of methyl acrylate, and from 30 to 5 parts by weight of poly-N-vinylpyrrolidone, in dimethylformamide.

10. A solution of a resinous composition comprising a mixture of from 70 to 95 parts by weight of an acrylonitrile polymer consisting of from 70 to 95 percent by weight of acrylonitrile and from 30 to 5 percent by weight of methyl methacrylate, and from 30 to 5 parts by weight of poly-N-vinylpyrrolidone, in dimethylformamide.

11. A synthetic fiber comprising from 70 to 95 parts by weight of an acrylonitrile polymer selected from the group consisting of polyacrylonitrile and a copolymer containing from 70 to 95 percent by weight of acrylonitrile and from 30 to 5 percent by weight of another polymerizable ethenoid monomer selected from the group consisting of a vinyl ester of a saturated fatty acid containing from 2 to 4 carbon atoms, an isopropenyl ester of a saturated fatty acid containing from 2 to 4 carbon atoms, an acrylic acid alkyl ester, a methacrylic acid alkyl ester, vinyl chloride, vinylidene chloride, styrene and alpha-methylstyrene, and from 30 to 5 parts by weight of poly-N-vinylpyrrolidone.

12. A synthetic fiber comprising from 70 to 95 parts by weight of polyacrylonitrile and from 30 to 5 parts by weight of poly-N-vinylpyrrolidone.

13. A synthetic fiber comprising 70 to 95 parts by weight of an acrylonitrile polymer consisting of from 70 to 95 percent by weight of acrylonitrile and from 30 to 5 percent by weight of vinyl acetate, and from 30 to 5 parts by weight of poly-N-vinylpyrrolidone.

14. A synthetic fiber comprising 70 to 95 parts by weight of an acrylonitrile polymer consisting of from 70 to 95 percent by weight of acrylonitrile and from 30 to 5 percent by weight of methyl acrylate, and from 30 to 5 parts by weight of poly-N-vinylpyrrolidone.

15. A synthetic fiber comprising 70 to 95 parts by weight of an acrylonitrile polymer consisting of from 70 to 95 percent by weight of acrylonitrile and from 30 to 5 percent by weight of methyl methacrylate, and from 30 to 5 parts by weight of poly-N-vinylpyrrolidone.

No references cited.